United States Patent [19]

Machon et al.

[11] Patent Number: 4,486,579

[45] Date of Patent: Dec. 4, 1984

[54] MODIFIED COPOLYMERS OF ETHYLENE AND α-OLEFINS AND A PROCESS FOR THEIR PREPARATION

[75] Inventors: Jean-Pierre Machon, Bethune; Genevieve Le Brasseur, Bully les Mines; Jean-Claude Decroix, Arras; Marius Hert, Aubigny en Artois, all of France

[73] Assignee: Societe Chimique des Charbonnages, Paris, France

[21] Appl. No.: 453,701

[22] Filed: Dec. 27, 1982

[30] Foreign Application Priority Data

Dec. 24, 1981 [FR] France .................. 81 24217

[51] Int. Cl.$^3$ .................. C08F 4/34
[52] U.S. Cl. .................. 526/65; 526/66; 526/348; 526/348.5; 526/348.6
[58] Field of Search .......... 526/65, 66, 348, 348.2, 526/348.3, 348.4, 348.5, 348.6

[56] References Cited

U.S. PATENT DOCUMENTS

| | | | |
|---|---|---|---|
| 3,325,442 | 6/1967 | McManimie | 524/855 |
| 3,862,265 | 4/1976 | Steinkamp et al. | 525/192 |
| 3,953,655 | 4/1976 | Steinkamp et al. | 428/483 |
| 4,001,172 | 4/1977 | Steinkamp et al. | 428/131 |
| 4,076,919 | 2/1978 | Urban | 526/65 |
| 4,105,842 | 8/1978 | Nicco | 526/65 |
| 4,205,021 | 5/1980 | Morita | 526/348.5 |
| 4,311,752 | 1/1982 | Diedrich | 526/348.6 |
| 4,390,677 | 6/1983 | Karol | 526/348 |

FOREIGN PATENT DOCUMENTS

| | | | |
|---|---|---|---|
| 919182 | 2/1963 | United Kingdom . | |
| 988846 | 4/1965 | United Kingdom . | |
| 1043082 | 9/1966 | United Kingdom . | |
| 1205635 | 9/1970 | United Kingdom | 526/65 |

OTHER PUBLICATIONS deJongh, H. et al., "The Radical Initiation of Vinyl Polymerization by α,α,α',α'-Tetrasubstituted Dibenzyls" 157 Die Makromolekular Chemie 279, (1972).

*Primary Examiner*—Paul R. Michl
*Attorney, Agent, or Firm*—Finnegan, Henderson, Farabow, Garrett & Dunner

[57] ABSTRACT

A modified copolymer of ethylene and of at least one α-olefin having from 3 to 12 carbon atoms, comprising from 0.5 to 10 mole percent of units derived from the α-olefin, wherein the measured limiting viscosity of the copolymer is between 1.5 and 10 times the limiting viscosity of the copolymer calculated from the molecular weight distribution of the copolymer. Process for producing these copolymers employing at least one free-radical initiator.

16 Claims, No Drawings

MODIFIED COPOLYMERS OF ETHYLENE AND α-OLEFINS AND A PROCESS FOR THEIR PREPARATION

BACKGROUND OF THE INVENTION

The present invention relates to modified copolymers of ethylene and of at least one α-olefin and to a process for their preparation.

It is possible to polymerize ethylene under a very high pressure and at elevated temperature, in the presence of a free-radical initiator. Such a reaction results in a polymer known as radical low-density polyethylene. Irrespective of its melt index, this polymer generally exhibits a tolerable stretchability in the manufacture of tubular casings, and a mediocre tear strength. Good stability of the bubble produced in extrusion-blowing is obtained and the polymer possesses an excellent processability. Good processability is defined as the absence of premature fracture of the extrudate ("melt fracture") combined with low power consumption during the extrusion.

Substantial improvements in the stretchability and tear strength have been made by preparing copolymers of ethylene and at least one α-olefin, for example, propylene or but-1-ene, in the presence of a Ziegler-type catalyst system. During extrusion-blowing of such copolymers, however, the bubble may become unstable, and the holes have a spontaneous tendency to grow larger in the event of perforation of the bubble. Premature fracture of the extrudate during extrusion is also found.

French Pat. No. 2,132,780 describes copolymers of ethylene with an α-olefin. These copolymers are modified in an extruder by a free radical initiator that is present in quantities between 0.005 and 5 weight percent in relation to the polymer to be modified, at a ₁re of 204° to 345° C. and under a pressure of bars. Polymers modified in this manner, when ₂d to unmodified polymers, all exhibit a reduced ₁ar weight, a fluidity index augmented by at least ₂ent, and a diminished molecular weight average.

ūish Pat. No. 1,043,082 describes an intimate mixof ethylene/α-olefin copolymers with 0.001 to 10 ₂ht percent of a free-radical initator, at a temperaₑ of 60° to 300° C., preferably in an extruder.

German Pat. Nos. 1,301,540 and 1,495,285 describe ₁e treatment, between 50° and 250° C., of a solution or .uspension of a polyolefin in an inert solvent by a free-radical initiator comprising 0.005 to 20 weight percent of the polyolefin. The treatment is carried out in the presence of a sensitizer such as, for example, sulfite, thiosulfate, hydrazine, or mercaptan. This procedure lowers the reduced viscosity of the polyolefin from a range of 1–20 to 0.3–5.

British Pat. No. 1,332,859 describes a continuous process for the polymerization of ethylene in at least two zones of a polymerization reactor. The process comprises continuous passage of the ethylene through a first polymerization zone under a pressure of not less than 1,600 bars and at a temperature not lower than 125° C., in the presence of a free-radical initiator. Then, the reaction medium containing the polymer and the unreacted ethylene, with or without additional ethylene, passes through a second polymerization zone under a pressure of at least 1,600 bars and at a higher temperature in the presence of a Ziegler catalyst. The combined temperature and pressure conditions in each zone are such that the polymerization takes place in a single liquid phase and the reaction medium remains in the form of a single liquid phase until it is removed from the last zone of the reactor.

French Pat. No. 2,202,898 describes a process for polymerization of ethylene under a pressure of more than 1,000 bars and at a temperature between 220° C. and 270° C. by means of a catalyst system comprising titanium trichloride and an alkyl-aluminium, and at least one compound chosen from among titanium alcoholates and silicone oils. The residence time of the catalyst system in the polymerization reactor is less than 150 seconds.

SUMMARY OF THE INVENTION

An object of the invention is to obtain ethylene polymers that simultaneously have, when applied to the manufacture of films, properties of radical low-density polyethylene, especially bubble stability and polymer processability, and properties of copolymers obtained in the presence of Ziegler-type catalyst systems, especially stretchability and tear strength.

Additional objects and advantages of the invention will be set forth in part in the description that follows, and in part will be obvious from this description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the invention comprises a modified copolymer of ethylene and at least one α-olefin having from 3 to 12 carbon atoms, comprising from 0.5 to 10 mole percent of units derived from the α-olefin, wherein the measured limiting viscosity of the copolymer is between 1.5 and 10 times the limiting viscosity of the copolymer calculated from the molecular weight distribution of the copolymer.

To further achieve the foregoing objects and also in accordance with the purpose of the invention, as embodied and broadly described herein, the invention further comprises a process for the preparation of ethylene copolymers, comprising the steps of: (a) copolymerizing ethylene with at least one α-olefin, in at least one reactor, in the presence of a Ziegler-type catalyst system, at a temperature of 180° C. to 320° C. and under a pressure of 300 to 2,500 bars. The average residence time of the catalyst system in the reactor being between 1 and 120 seconds; and (b) introducing from 0.01 to 1 millimole, per kilogram of copolymer, of at least one free-radical initiator, at the end of the polymerization reaction, at a temperature between 220° and 320° C., under a pressure between 500 and 1,000 bars.

DESCRIPTION OF THE PREFERRED EMBODIMENTS

Reference will now be made in detail to the presently preferred embodiments of the invention.

The invention partly relates to modified copolymers of ethylene and at least one α-olefin having from 3 to 12 carbon atoms, comprising from 0.5 to 10 mole percent of units derived from the α-olefin, wherein the measured limiting viscosity is calculated from the molecular weight distribution.

The α-olefin may be preferably chosen from the group consisting of propylene, but-1-ene, pent-1-ene, hex-1-ene, methyl-pent-1-ene, hept-1-ene, oct-1-ene, or mixtures thereof.

The term "measured limiting viscosity," means the value of the viscosity at zero shear gradient, obtained by extrapolation of the curve of the measured viscosity as a function of the shear gradient. The measurements are carried out with the aid of any suitable equipment, for example, the rheometer balance described in French Pat. No. 1,462,343. The measurements are advantageously carried out at 190° C., the temperature at which the melt index is measured according to ASTM Standard Specification D 1238-73.

The term "calculated limiting viscosity," means the value of the viscosity at zero shear gradient, obtained by calculation from the molecular weight distribution determined by gel permeation chromatography (GPC). The theory of Bueche 25 J. Chem. Phys. 599 (1956) teaches that a linear polymer, if it is isomolecular obeys a relationship of the type $\eta_o = K M^{3.4}$, wherein $\eta_o$ is the limiting viscosity, K is a temperature-dependent proportionality coefficient, and M is the average molecular weight. If the polymer is polydisperse, this relationship must include a rheological average molecular weight $M_t$ expressed as a function of $C_i$, the percentage by weight, and $M_i$, the molecular weight of each fraction of the polymer determined by GPC, by the relationship:

$$M_t = (\Sigma\ C_i M_i^{1.21})^{\frac{1}{1.21}}$$

At a temperature of 190° C., the following relationship is obtained experimentally for ethylene/α-olefin copolymers:

$$\log \eta_o^c = 3.482 \log M_t - 13.342.$$

Thus, irrespective of the particular copolymer modified according to the invention, $\eta_o^c$ is the calculated limiting viscosity which any ethylene/α-olefin copolymer having the same number-average molecular weight ($M_n$), the same weight-average molecular weight ($M_w$), the same melt index (MI) and the same density ($\rho$) would have. The ratio $\eta_o^m/\eta_o^c$ obtained for unmodified copolymers of ethylene and of an α-olefin is approximately equal to 1, within the limits of experimental error.

The improved behavior of the modified copolymers according to the invention, during the extrusion-blowing of films, is apparently attributable to the fact that they have a ratio of between 1.5 and 10.

The modified copolymers according to the invention generally have a melt index of between 0.1 and 10 dg/min and a density of between 0.910 and 0.955 g/cm$^3$. In the application to the manufacture of tubular films, i.e., when the melt index does not exceed about 3 dg/min, these modified copolymers show a noteworthy processability and excellent properties, in particular an "industrial" stretchability, defined as having the thickness of film of as little as 7 microns yet permitting continuous manufacture by extrusion-blowing for a period of 2 hours without perturbations.

An additional subject of the present invention concerns preparation of the modified copolymers described above. In a first variation of a process for preparing the modified copolymers, a preferably continuous copolymerization of ethylene and at least one α-olefin takes place in at least one reactor in the presence of a Ziegler catalytic system at a temperature of 180° C. to 320° C. and under a pressure of 300 to 2,500 bars. Up to 2 mole percent hydrogen may be present if desired, and the average residence time in the reactor should be between 1 and 120 seconds. At the end of the copolymerization reaction, at least one free-radical initiator is introduced. Between 0.01 and 1 millimole of initiator per kilogram of copolymer is introduced into the polymerization reactor, or into another reactor, with the copolymer. The reaction conditions are maintained at between 220° C. and 320° C. and between 500 and 1,000 bars. The pressure is chosen to prevent the polymerization of unreacted monomer and hence avoid the formation of radical low-density polyethylene. The reaction time may be between 5 and 200 seconds.

The copolymerization is carried out in at least one reactor comprising at least one reaction zone. The reactor may be an autoclave or a tubular reactor with several reaction zones. A particular arrangement of the polymerization installation, for example, one of those described in French Pat. Nos. 2,346,374 or 2,385,745 may preferably be adopted for use with this invention. The α-olefin may be either introduced separately or formed by the oligimerization of ethylene. The proportion of α-olefin in the reaction mixture depends on the nature of the α-olefin; it is advantageously between 15 and 35 weight percent for propylene, between 5 and 65 weight percent for but-1-ene, and between 5 and 80 weight percent for hex-1-ene. The proportion need not necessarily remain constant over the length of the reactor.

The Ziegler-type catalyst system comprises at least one activator chosen from among the hydrides and the organometallic compounds of metals from groups I to III of the Periodic Table and at least one halogen compound of a transition metal from groups IVa to VIa of the Periodic Table, optionally fixed to an inert support or mixed with a compound of a metal from group VIII of the Periodic Table.

The activator may be:

an alkyl-aluminium, such as triethyl-aluminium, tributyl-aluminium, triisobutyl-aluminium, or trioctyl-aluminium;

a chlorodialkyl-aluminium, such as chlorodiethyl-aluminium;

a dichloroalkyl-aluminimum, such as dichloroethyl-aluminium;

an alkylsiloxalane of the formula

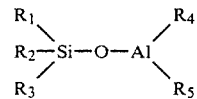

R$_1$, R$_2$, R$_3$ and R$_4$ being hydrocarbon radicals having from 1 to 10 carbon atoms and R$_5$ being either a hydrocarbon radical having from 1 to 10 carbon atoms or a radical of the type

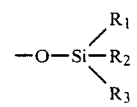

a mixture of an alkyl-metal halide (other than fluoride) and an alkyl-metal fluoride; or a composition based on fluorides of alkyl aluminum of the formula $(AlR_2F)(AlR_2X)_a$ or, preferably, $(AlR_2F)(AlR_2H)_b(AlR_3)_c$, wherein R is an alkyl group having from 1 to 12 carbon atoms, X is a halogen other than fluorine, $0.1 \leq a \leq 0.4$, $0.1 \leq b \leq 0.4$ and $0.05 \leq c \leq 0.2$.

The halogen compound of a transition metal from groups IVa to VIa of the Periodic Table, optionally fixed to an inert support or mixed with a compound of a metal from group VIII of the Periodic Table, can be:

violet titanium chloride, $TiCl_3 \cdot \frac{1}{3} AlCl_3$;

a compound of the formula $(TiCl_a)(MgCl_2)_y(AlCl_3)_z (RMgCL)_b$, in which $2 \leq a \leq 3$, $y \geq 2$, $0 \leq z \leq \frac{1}{3}$ and $0 \leq b \leq 1$, by itself or mixed with a compound of the formula $TiCl_3(AlCl_3)_w(E\ TiCl_4)_x$, in which $0 \leq w \leq \frac{1}{3}$, $0 \leq x \leq 0.03$, and E is diisoamyl or di-n-butyl ether;

the product obtained by bringing a complex magnesium compound, comprising at least one compound chosen from among magnesium monohalides and halogeno-magnesium hydrides, into contact with a titanium or vanadium halide in which the metal has a valency $\leq 3$;

a compound of the formula $(MX_a)(MgX_2)_b (RMgX)_c (HMgX)_d$, in which M is a metal from group IVa or Va of the Periodic Table, X is a halogen, R is a hydrocarbon radical, $2 \leq a \leq 3.5$, $1 \leq b \leq 30$, $1 \leq c \leq 8$ and $0 \leq d \leq 10$;

a compound of the formula $(TiCl_3 \cdot \frac{1}{3} AlCl_3)(MCl_3)_x (MgX_2)_y$, in which M is a transition metal from groups Va and VIa of the Periodic Table, X is a halogen, $0.3 \leq x \leq 3$ and $0 \leq y \leq 20$;

a compound formed of mixed crystals containing either $TiCl_3$ or $TiCl_2$, and $AlCl_3$, and other metal chlorides such as $FeCl_2$, $NiCl_2$, $MoCl_3$ and $MgCl_2$;

a compound of the formula $(MX_3)(\phi_n SiL_{4-n})_b$, in which M is a transition metal from groups IVa to VIa of the Periodic Table, $\phi$ is an optionally substituted aromatic or polyaromatic nucleus having from 6 to 15 carbon atoms, L is either a halogen atom or a hydroxyl group, $1 \leq n \leq 3$, and $0.2 \leq b \leq 2$, the compound being associated, if appropriate, with $AlCl_3$, $MgCl_2$, and/or a halide of a metal from group VIII of the Periodic Table; or a compound of the formula $X_{m-n}M(OR)_n$ that is brought into contact with a halogen derivative of a transition metal from groups IVa to VIa of the Periodic Table, in which M represents one or more metals from groups Ia, IIa, IIb, IIIb, and VIIa of the Periodic Table, X is a monovalent inorganic radical, R is a monovalent hydrocarbon radical, m is the valency of M, and $1 \leq n \leq m$.

The inert support on which the Ziegler catalyst is deposited comprises, for example, one or more of the following compounds: $MgCl_2$, $Al_2O_3$, $MoO_3$, $MnCl_2$, $SiO_2$ and $MgO$.

The process according to the invention may be carried out the copolymerizing ethylene and an α-olefin in the presence of a saturated hydrocarbon, such as propane, butane or other such compound, employed at a rate of up to 50 weight percent, mainly when the temperature and/or the pressure are low. For precise control over the melt index of the modified copolymer obtained, it can also be advantageous to carry out the copolymerization in the presence of up to 2 mole percent hydrogen.

The copolymer obtained from the polymerization is brought into contact with at least one free-radical initiator. This process can be carried out by injecting a solution or a suspension of the free-radical initiator into the last reaction zone of the reactor or of the series of reactors. The pressure in the reactor or series of reactors is less than 1,000 bars. This process can also be carried out in a separator, operating under a pressure of 50 to 500 bars, located downstream of the reactor, and the purpose of which is to separate the copolymer formed from the unreacted monomers. It can also be carried out in the machine for converting or transforming the copolymer, such as, for example, an extruder or a press, fed under a pressure of between 1 bar and 25 bars; it is well known that the pressure in an extruder can reach 250 bars, depending on the profile of the extrusion screw. The bringing of the free-radical initiator into contact with the copolymer in the converting machine is advantageously carried out using a solution of the initiator or a master mixture prepared dry.

A variation of the above-described process also comprises introduction of a free-radical initiation at the end of the ethylene and at least one α-olefin polymerization reaction. The free-radical initiator may be in a solution or suspension in the last reaction zone of a reactor or assembly of reactors, or in the last reactor of a group of reactors arranged in series. The pressure in the last reactor or last reaction zone should be between 500 and 1000 bars. The free-radical initiator is advantageously selected from among the peroxides and benzopinacol. A preferred peroxide is ditertbutylperoxide.

Another variation of the aboved-described process comprises polymerization of ethylene and at least one α-olefin in the presence of a Ziegler type catalyst system at a temperature of 30° to 320° C. and at a pressure of 1 to 2,500 bars. The reaction mixture may also contain up to 2 mole percent hydrogen. After the polymerization, the copolymer obtained is reacted with 0.1 to 1 millimole per kilogram of copolymer of at least one free-radical initiator selected from the 2,2'-azo-bis-(acyloxyalkanes) at a temperatures of 220° to 320° C. for 5 to 200 seconds in a transformation machine.

All copolymers of ethylene and at least one α-olefin having from 3 to 12 carbon atoms may be modified in accordance with the latter variation. The variation works on copolymers in a gaseous state, a liquid state, or in solution. Preferable free radical initiators for this latter variation are 2,2'-azo-bis(acetoxybutane); 2,2'-azo-bis(acetoxyisobutane); and 2,2'-azo-bis(propionoxypropane).

The free-radical initiator may be chosen from among organic peroxides and hydroperoxides and diazo derivatives. Its half-life must be at least equal to the period of contact with the copolymer at the temperature used, this period generally being longer in a converting machine than in a reactor or a separator. The amount of free-radical initiator used is preferably between 0.01 and 1 millimole per kilogram of copolymer produced.

The object of the examples that follow is to illustrate some embodiments of the invention without implying a limitation.

EXAMPLE 1

A mixture consisting of 60 weight percent ethylene and 40 weight percent but-1-ene is copolymerized, under a pressure of 980 bars, in a cylindrical autoclave reactor having a volume of 3 liters, which is divided into 3 zones with the aid of metal screens. The temperatures are 250° C. in the first zone, 258° C. in the second zone and 256° C. in the third zone. The catalyst system comprises the catalyst $TiCl_3 \cdot \frac{1}{3} AlCl_3 \cdot VCl_3$ activated by dimethylethyldiethylsiloxalane (activator A hereafter), in a ratio Al/Ti+V=3. The catalytic system is injected into the first and second zones. 0.065 millimoles of di-tert-butyl peroxide per kg of copolymer is introduced into the third zone in the form of a solution in methylcyclohexane.

Apart from the amount of initiator used, in millimoles per kg of copolymer, the following characteristics of the modified copolymer obtained (and of the modified copolymers obtained in accordance with the examples which follow) are shown in Table 1:

The proportion of units derived from the α-olefin in the modified copolymer obtained, determined by infrared spectroscopy, in mole percent;

The catalytic yield of copolymer in kg per milligram atom of titanium;

The density, $\rho$, in g/cm$^3$,

The melt index, MI, in dg/min, measured at 190° C. according to ASTM Standard Specification D 1238-73;

The limiting viscosity measured at 190° C. with the aid of the rheometer balance described in French Pat. No. 1,462,343, and expressed in poises; and The ratio $\eta_o^m/\eta_o^c$.

EXAMPLE 2 (comparison)

The conditions used are the same as in Example 1, but no peroxide is introduced into the third zone. The results are given in Table 1.

EXAMPLE 3

A mixture of 70 weight percent ethylene and 30 weight percent but-1-ene is copolymerized, under a pressure of 600 bars, in the reactor of Example 1, the zones of which are heated respectively to temperatures of 185° C., 230° C., and 270° C.

A catalyst system comprising the catalyst TiCl$_3$.⅓AlCl$_3$.2VCl$_3$ activated by activator A in a ratio Al/Ti+V=3, is injected into the first 2 zones.

The same catalyst system, to which 0.031 millimoles of benzopinacol per kg of copolymer has been added, is injected into the 3rd zone. The results are given in Table 1.

EXAMPLE 4

Ethylene is polymerized in the presence of 6 volume percent propane in equipment comprising two reactors arranged in series, the first reactor comprising 3 reaction zones kept respectively at temperatures of 200° C., 225° C., and 185° C. and under a pressure of 1,200 bars, and the second reactor comprising 2 reaction zones kept respectively at temperatures of 235° C. and 280° C. and under a pressure of 900 bars. The catalyst system, which is identical to that of Example 1, is injected into the first and third zones of the first reactor. The catalyst TiCl$_3$.⅓AlCl$_3$.2VCl$_3$ activated by an equimolecular mixture of Al(C$_2$H$_5$)$_3$ and Al(C$_2$H$_5$)$_2$Cl, in a ratio Al/Ti=3, is injected into the first zone of the second reactor.

0.2 millimoles, per kg of copolymer, of di-tert-butyl peroxide dissolved in a mixture of saturated C$_{11}$-C$_{12}$ hydrocarbons is injected into the second zone of the second reactor.

The operating conditions and the catalyst system used are such that the ethylene partially dimerizes to but-1-ene, which then copolymerizes with it to form a copolymer containing 0.6 mole percent of units derived from but-1-ene.

EXAMPLE 5 (comparison)

A mixture of 55 weight percent ethylene and 45 weight percent but-1-ene is copolymerized, under a pressure of 950 bars, in the presence of 0.1 volume percent hydrogen, in the reactor of Example 1, the zones of which are kept respectively at temperatures of 250° C., 260° C., and 260° C.

The catalyst TiCl$_3$.⅓AlCl$_3$.2VCl$_3$ activated by the activator A in a ratio Al/Ti=3, is introduced into the first and second zone.

On a type B 60 REIFENHAUSER machine, 50 micron thick tubular films were extruded at a temperature of 240° C. and in a flowing ratio of 2. The following properties are measured and recorded in Table 2:

The tear strength, TS, (expressed in g/5μ, in the longitudinal direction, L, and the transverse direction, T, determined according to ASTM Standard Specification D 1922-67;

The creep strength (resistance au fluage), RF, determined according to French Standard Specification NF T 51103;

The impact strength (resistance al l'imact), RI, expressed in grams, measured according to ASTM D 1709/80;

The industrial stretchability, IS, (expressed in μ);

The haze, H, (expressed in percent), measured according to Standard Specification E 2421; and The energy consumed, W, (expressed in KWh/kg).

EXAMPLE 6

The conditions used are the same as in Example 5, 0.1 millimole of di-tert-butyl peroxide, dissolved in methylcyclohexane, per kg of copolymer produced, being additionally introduced into the 3rd reaction zone. The proportion of hydrogren is modified by bringing it to 0.3 volume percent, relative to the mixture of ethylene and but-1-ene, so as to obtain a copolymer with a density identical to that of the copolymer obtained in Example 5. The modified copolymer obtained is extruded under the same conditions as in Example 5. Its properties are recorded in Table 2.

EXAMPLE 7 (comparison)

The conditions used are the same as those in Example 5, but hydrogen is absent.

EXAMPLE 8

The conditions used are the same as those in Example 5, but 0.15 volume percent hydrogen is present. 0.3 millimoles of 2,2'-azo-bis-(2-acetoxypropane), dissolved in a C$_{12}$-C$_{14}$ cut of saturated hydrocarbons, per kg of copolymer, is injected into the extruder. The modified copolymer extruded possesses the characteristics shown in Table 1.

EXAMPLE 9

0.59 millimoles per kg of 2,2'-azo-bis-(2-acetoxypropane), dissolved in a C$_{12}$-C$_{14}$ cut of saturated hydrocarbons, is added to the copolymer obtained in Example 5, at the moment when it passes into the extruder, at a temperature of 240° C. This gives an extruded modified copolymer, the characteristics of which are shown in Table 1.

EXAMPLE 10

By injecting, into the extruder, 0.2 millimoles of 2,2'-azo-bis-(2-acetoxypropane) per kg of copolymer obtained in Example 5, in the form of a master mixture prepared dry, based on the same copolymer containing 4,000 ppm of this initiator, the modified copolymer of which the characteristics are shown in Table 1 is obtained.

EXAMPLE 11

Under the operating conditions described in Example 1, a mixture of 75 weight percent ethylene and 25 weight percent of but-1-ene, also comprising 0.4 volume percent hydrogen, is copolymerized. Di-tert-butyl peroxide, dissolved in methylcyclohexane, is introduced into the third reactor zone at a rate of 0.1 millimole per kg of copolymer. The characteristics of the copolymer modified in this way are shown in Table 1.

The purpose of the above description is to illustrate some embodiments of the present invention without implying a limitation. It will be apparent to those skilled in the art that various modifications and variations may be made in the composition or process of the invention without departing from the scope or spirit of the invention.

TABLE 1

| Example | Initiator (millimole/kg) | α-olefin Units (mole percent) | Catalytic yield | ρ (g/cm$^3$) | MI (dg;min) | $\eta_o^m$ (poises) | $\eta_o^m/\eta_o^c$ |
|---|---|---|---|---|---|---|---|
| 1 | 0.065 | 1.8 | 6.5 | 0.930 | 0.85 | 138,000 | 1.6 |
| 2 | — | 1.8 | 7.1 | 0.930 | 2.40 | 34,500 | 0.95 |
| 3 | 0.031 | 3.0 | 5.8 | 0.922 | 1.25 | 173,000 | 1.8 |
| 4 | 0.2 | 0.6 | 7.5 | 0.955 | 1.20 | 96,000 | 2.5 |
| 5 | — | 3.8 | 5.5 | 0.919 | 1.20 | 66,000 | 1.0 |
| 6 | 0.1 | 3.8 | 5.2 | 0.919 | 1.20 | 160,000 | 2.3 |
| 7 | — | 3.8 | 6.2 | 0.919 | 0.70 | 110,000 | 1.05 |
| 8 | 0.3 | 3.8 | 5.7 | 0.919 | 0.70 | 250,000 | 2.3 |
| 9 | 0.59 | 3.8 | 5.5 | 0.919 | 0.45 | 481,000 | 5.9 |
| 10 | 0.2 | 3.8 | 5.5 | 0.919 | 1.0 | 144,000 | 3.0 |
| 11 | 0.1 | 0.9 | 7.2 | 0.940 | 8.0 | 29,000 | 2.2 |

TABLE 2

| EXAMPLE | TS L | TS T | RF | RI | IS | H | W |
|---|---|---|---|---|---|---|---|
| 5 | 350 | 650 | moderate | 250 | 7 | 5 | 0.380 |
| 6 | 430 | 580 | very good | 240 | 7 | 4.5 | 0.335 |

What is claimed is:

1. A process for the preparation of ethylene copolymers comprising the steps of: (a) copolymerizing ethylene with at least one α-olefin, in at least one reactor, in the presence of a Ziegler-type catalyst system, at a temperature of 180° C. to 320° C. and under a pressure of 300 to 2,500 bars, the average residence time of the catalyst system in the reactor being between 1 and 120 seconds; and (b) introducing from 0.01 to 1 millimole, per kilogram of copolymer, of at least one free-radical initiator, at the end of the polymerization reaction, at a temperature between 220° C. and 320° C., under a pressure between 500 and 1,000 bars.

2. The process of claim 1, wherein said ethylene and said α-olefin are copolymerized in the presence of up to 2 mole percent hydrogen.

3. The process of claim 1, wherein said free-radical initiator is introduced into the last reaction zone of a reactor.

4. The process of claim 2, wherein said free-radical initiator is introduced into the last reaction zone of a reactor.

5. The process of claim 1, wherein said free-radical initiator is introduced into the last reactor of a set of reactors arranged in series.

6. The process of claim 2, wherein said free-radical initiator is introduced into the last reactor of a set of reactors arranged in series.

7. The process of claim 1, wherein said free-radical initiator is a peroxidic compound.

8. The process of claim 2, wherein said free-radical initiator is a peroxidic compound.

9. The process of claim 7, wherein said peroxidic compound is di-tert-butyl peroxide.

10. The process of claim 8, wherein said peroxidic compound is di-tert-butyl peroxide.

11. The process of claim 1, wherein said free-radical initiator is benzopinacol.

12. The process of claim 2, wherein said free-radical initiator is benzopinacol.

13. A process for the preparation of modified copolymers of ethylene comprising the steps of: (a) copolymerizing ethylene with at least one α-olefin, in at least one reactor, in the presence of a Ziegler-type catalytic system, at a temperature of 30° C. to 320° C., and under a pressure of 1 to 2,500 bars to produce a copolymer; and (b) bringing said copolymer into contact with 0.01 to 1 millimole, per kilogram of said copolymer, of at least one free-radical initiator selected from the group consisting of 2,2'-azo-bis(acyloxyalkanes), at a temperature of 220° C. to 320° C., for a period of 5 to 200 seconds, in a transformation machine.

14. The process of claim 13, wherein said 2,2'-azo-bis-(acyloxyalkane) is 2,2'-azo-bis-(2-acetoxypropane).

15. The process of claim 13, wherein said ethylene and said α-olefin are copolymerized in the presence of up to 2 mole percent hydrogen.

16. The process of claim 15, wherein said 2,2'-azo-bis (acyloxyalkane) is 2,2'-azo-bis-(2-acetoxy propane).

* * * * *